(12) United States Patent
Kanke et al.

(10) Patent No.: US 7,499,819 B2
(45) Date of Patent: Mar. 3, 2009

(54) FLOW MEASURING DEVICE

(75) Inventors: Atsushi Kanke, Hitachinaka (JP);
Takahiro Miki, Hitachinaka (JP); Kelji Hanzawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/698,074

(22) Filed: Jan. 26, 2007

(65) Prior Publication Data
US 2007/0179728 A1 Aug. 2, 2007

(30) Foreign Application Priority Data
Feb. 2, 2006 (JP) .............................. 2006-025589

(51) Int. Cl.
- G01F 1/12 (2006.01)
- G01F 1/50 (2006.01)
- G01F 25/00 (2006.01)

(52) U.S. Cl. ...................................................... 702/100
(58) Field of Classification Search .................. 702/45, 702/50, 100
See application file for complete search history.

(56) References Cited

U.S. PATENT DOCUMENTS

| 6,397,673 B1 * | 6/2002 | Kanke et al. | 73/204.11 |
| 6,520,009 B2 * | 2/2003 | Kobayashi et al. | 73/204.18 |
| 6,839,643 B2 * | 1/2005 | Kanke et al. | 702/45 |
| 7,280,927 B1 * | 10/2007 | Dmytriw | 702/45 |
| 2005/0072225 A1 * | 4/2005 | Kanke et al. | 73/204.11 |
| 2006/0217901 A1 * | 9/2006 | Kanke et al. | 702/45 |

FOREIGN PATENT DOCUMENTS

| JP | 11-316145 | 11/1999 |
| JP | 11-337382 | 12/1999 |
| JP | 2000-161122 | 6/2000 |
| JP | 2004-20454 | 1/2004 |

* cited by examiner

*Primary Examiner*—Michael P Nghiem
(74) *Attorney, Agent, or Firm*—Mattingly, Stanger, Malur & Brundidge, PC

(57) ABSTRACT

A flow measuring device has a sensor element for outputting a nonlinear signal according to a flow rate. In the device, a first signal processing system obtains a first signal by filtering the nonlinear signal output from the sensor element, thereafter corrects a sensitivity of the filtered signal. A second signal processing system obtains a second signal by linearizing the nonlinear signal from the sensor element, thereafter filters the linearized signal and corrects a sensitivity of the filtered signal, and then non-linearizes the linearized signal with a corrected sensitivity. An amplifier amplifies a differential signal between the first and second signals. A correcting section corrects the nonlinear signal by using the amplified differential signal.

10 Claims, 11 Drawing Sheets f1 : V-Q CONVERSION f2 : Q-V CONVERSION

PROCESSED SIGNAL

SENSOR OUTPUT SIGNAL AFTER ERROR CORRECTION $f1 : Q = V*V*V$ $f2 : V = \sqrt{Q}$

EXAMPLE OF SAMPLING OF CHARACTERISTIC OF SENSOR OUTUT SIGNAL

GAIN CORRECTION FUNCTION

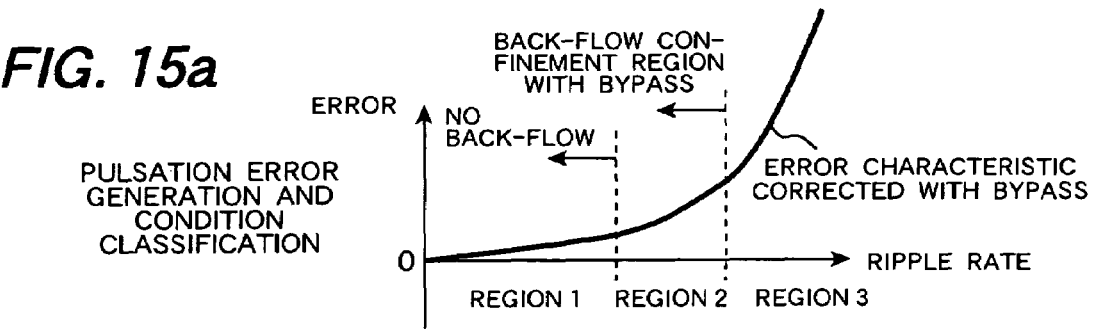
FIG. 15a PULSATION ERROR GENERATION AND CONDITION CLASSIFICATION
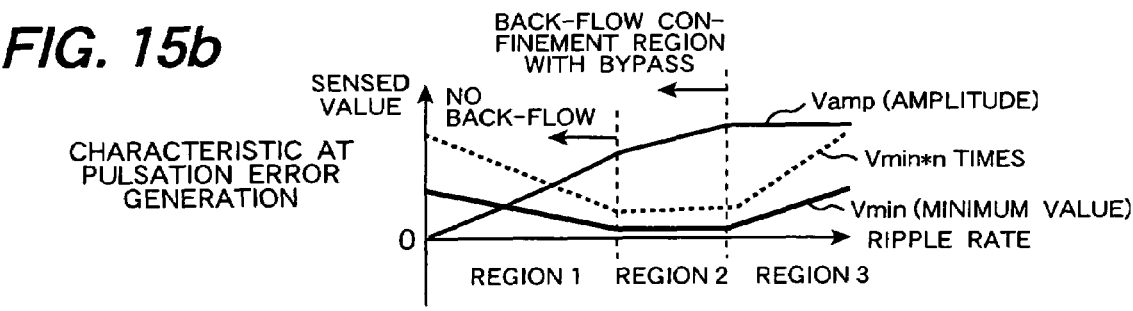
FIG. 15b CHARACTERISTIC AT PULSATION ERROR GENERATION
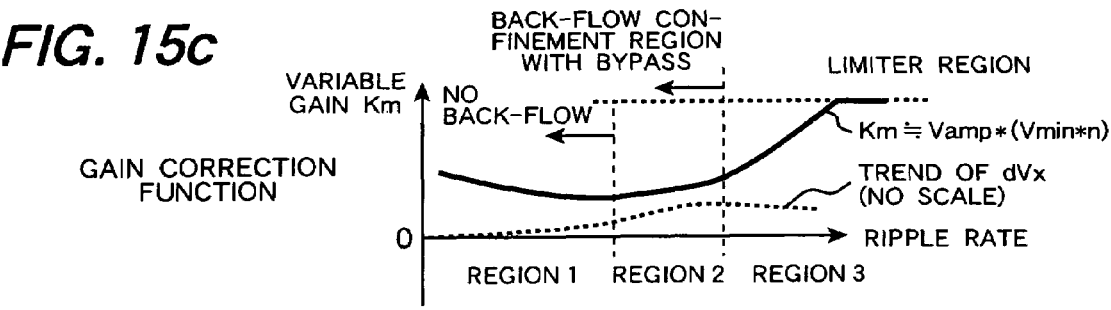
FIG. 15c GAIN CORRECTION FUNCTION
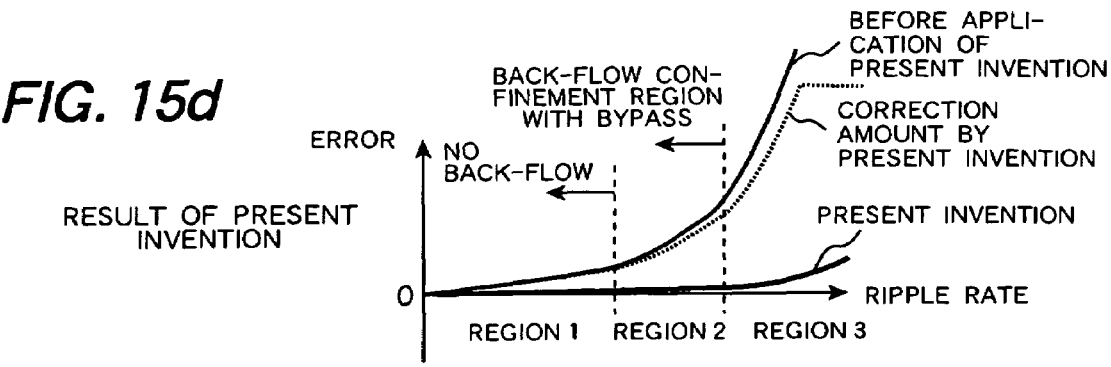
FIG. 15d RESULT OF PRESENT INVENTION

PROCESSED SIGNAL

SENSOR OUTPUT SIGNAL AFTER ERROR CORRECTION

PROCESSED SIGNAL

SENSOR OUTPUT SIGNAL AFTER ERROR CORRECTION

PRIOR ART

FLOW MEASURING DEVICE

CLAIM OF PRIORITY

The present application claims priority from Japanese application serial no. 2006-025589, filed on Feb. 2, 2006, the contents of which are hereby incorporated by references into this application.

TECHNICAL FIELD

The present invention relates to a device to measure a flow rate of a fluid such as air.

BACKGROUND ART

A thermal flowmeter is known as a typical flow measuring device having a sensing element for outputting a nonlinear signal in accordance with a flow rate. A thermal flowmeter can directly sense, for example, a mass flow rate of intake air to be fed into the internal combustion engine of an automobile. The measured flow rate is used as computation data for fuel injection control of an electronic control type.

A heat resistive element used for the thermal air flowmeter has a temperature dependency. Examples thereof are a hot wire type heat resistive element produced by means of winding a platinum wire around a bobbin and of coating the platinum wire with glass, and a thin film type heat resistive element produced by forming a thin film resistor on a ceramic substrate or a silicon substrate.

As systems for measuring a flow rate, the following systems are proposed. One of them is a system of measuring an air flow rate by converting a heating current flowing through the heat resistive element into a voltage, wherein the heating current is controlled so as to maintain a constant temperature difference between a temperature of the heat resistive element whose heat is taken away in accordance with the air flow rate and a temperature of air to be measured as flow rate. Another is a system of measuring an air flow rate based on a temperature deference between temperature sensitive elements (thermo-sensitive resistors) disposed on both sides of a heat resistive element in a direction of air flow.

Air flowing through an intake pipe of an engine pulsates due to opening and closing operations of an inlet valve of the engine and hence an output signal of a flow sensor (thermal flowmeter) also accompanies pulsation. Incidentally, a rate of change in output voltage of the thermal flowmeter is large (high sensitivity) in a low flow rate region and the rate of the change changes slowly as the flow rate increases (low sensitivity). That is, a thermal flowmeter shows a so-called nonlinear output characteristic.

In the nonlinear output characteristic, a voltage of the flow sensor can be represented by the fourth root of a flow rate (King's formula). The output characteristic Qref is shown in FIG. 20. The vertical axis represents a sensor output voltage (V) and the horizontal axis represents an air flow rate. In FIG. 20, as an example, a sensor output voltage Vin to a flow rate Qa with relatively large pulsation (ripple) and a sensor output voltage Vinf to a flow rate Qaf with relatively small pulsation (ripple) are shown. Even when an actual pulsing flow rate has a curve like a sine curve, the sensor output voltage has a somewhat distorted waveform whose positive-side is compressed and whose negative-side is extended. If the output voltage containing such pulsative component is rendered as a mean value (average) as-is status, the mean value of flow rate-waveform apparently decreases (as an error). The error increases as the pulsation increases. In FIG. 20 for example, whereas an actual mean value of a sensor output voltage Vin should be Vave1, the apparent mean value is Vave2, and that causes the error Vave1−Vave2. Note that, when pulsation is significantly increased until back-flow occurs, the mean value of flow rates apparently increases in reverse to the above-mentioned. Especially, in the case of low rotation speed or heavy loading operation of an engine having four or fewer cylinders, it sometimes happens that the amplitude of the pulsation of an intake air flow rate is large and back-flow is partially accompanied. In such a case, a pulsation error (ripple error) of the sensed flow rate signal is apparently caused in the positive (namely flow rate increase) direction. The pulsation error causes measurement accuracy to lower. Here, the relationship between the degree of pulsation (a ripple rate) and the error of a sensor output is described later in reference to FIGS. 8 and 10.

A system of using a variable filter in order to reduce such a pulsation error is described in JP-A No. 161122/2000.

Incidentally, as a conventional art for reducing a pulsation error, a technology of linearizing a sensor output voltage is known. Generally, data used such a linearization processing is made and stored by the following method: namely, measuring a voltage signal of a sensor related to a flow rate actually; making a characteristic curve used as reference (called a master characteristic Qref) based on the actual measured voltage and the flow rate; and storing the characteristic curve data in an engine control unit or the like. Then, the linearization processing (V-Q conversion processing) is carried out by applying the master characteristic Qref to the real flow rate sensed by the sensor.

The pulsative component of a sensor output voltage includes also an error component such as noise. A system of smoothening a signal with a hard filter in advance of the linearization processing and thereafter applying the linearization processing in order to reduce such an error component is known.

In the system, as shown in FIG. 21, an output voltage value (a signal sensed by a heat resistive element) is smoothened so that the amplitude thereof is reduced (for example, so that an amplitude V1 is reduced to an amplitude V2) while the mean value itself of the output voltage is not changed. However, when a sensed signal is linearized (V-Q conversion) after filtered (smoothened) as stated above, an error arises also in the mean value of a converted flow rate, as shown in FIG. 21.

In order to reduce such an error, JP-A Nos. 316145/1999 and 337382/1999 propose a system of smoothening a sensor output voltage with a filter after linearizing (V-Q conversion) the sensor output voltage. Then, a flow rate signal whose pulsation (ripple) amplitude is reduced with the filter is non-linearized again (Q-V conversion), subjected to D-A conversion, and input into an engine control unit which has a function for the linearization processing.

JP-A No. 20454/2004 proposes a system of modulating the output power of a nonlinear output signal of a sensor with a parameter for modulation, and thereafter applying unequal linearization for modulating a mean value. By the method, it is possible to arbitrarily modulate the mean value in accordance with the magnitude of pulsation and to obtain an air flow rate signal with a higher degree of accuracy.

SUMMARY OF THE INVENTION

Under the circumstances of large pulsation and large back-flow in an internal combustion engine or the like, in consideration of the situation where a pulsation error of a flowmeter-signal increases in accordance with the magnitude of pulsation and frequency, it is intended to improve the situation by a system alternative to such unequal linearization as stated above.

The basic difference between the present invention and conventional systems in reducing a pulsation error of flow rate signal (a measured signal) is as follows. In conventional systems, one of them is that a nonlinear sensed flow rate signal (an original signal from a sensor element) is linearized, the other of them is that a nonlinear sensed flow rate signal is smoothened and linearized, and further the other is that a nonlinear sensed flow rate signal is linearized and smoothened, and the signal itself thus processed is used as the sensed flow rate signal. Alternatively, in the present invention, a sensed flow rate signal is processed to obtain a correction amount for a pulsation error. The pulsation error correction amount is added to or subtracted from the nonlinear sensed flow rate signal (namely original output signal from the sensor element) and thereby the sensed flow rate signal is corrected. The present invention proposes the following means for such a flow rate signal.

(1) A correction amount for pulsation error (it's also called as a pulsation error correction amount) according to the present invention can be obtained by, for example, a first signal processing system and a second signal processing system that are described below.

In the first signal processing system, a nonlinear signal (namely, an output voltage corresponding to the nonlinear sensed flow rate, it's also called as original output signal or original signal) output from a flow rate-sensor element is integrated, thereafter the sensitivity of the output signal is corrected, and thus a first signal is obtained. The integration of the nonlinear output signal is carried out by, for example, smoothening (filtering) with a filter to intentionally produce a mean value error (a nonlinear error) of a pulsating (in other words, including an AC component) nonlinear output signal. The correction of an output sensibility (namely an output sensibility of the output signal from the sensor element) is carried out by linearization for example.

In the second signal processing system, a nonlinear original signal (an original signal: an output voltage) from the flow rate sensor-sensor element is linearized, then integrated (smoothened), and thereafter nonlinearized again, and thus a second signal is obtained. In the second signal processing system, the output signal of the flow rate-sensor element is firstly linearized to correct the sensibility of the output signal, and a second signal scarcely yielding the mean value error is produced. Further, by the integration (smoothening) after the linearization, the phase difference between the second and first signals is matched (phase difference matching means).

The differential signal between the first and second signals is amplified to become a pulsation error correction amount. By adding or subtracting the pulsation error correction amount to or from the output signal (non lininear original signal) from the flow rate sensor, the nonlinear original signal including a pulsation error is corrected. Refer to FIG. 3 for example.

(2) An another system, a pulsation error correction amount is obtained as follows.

For example, a nonlinear original signal from a sensor is filtered. The absolute value of the differential signal between the filtered signal and the original signal is obtained. The absolute value of the differential signal is filtered. The filtered differential signal is amplified. The amplified differential signal is used for the correction of the nonlinear original signal.

The present invention makes it possible to reduce a measurement error of a flow measuring device caused by pulsation without deteriorating the basic characteristics of a sensor output.

BRIEF DESCRIPTION OF THE DRAWINGS

FIG. 15 comprises other explanatory graphs showing operations in the computation processing of a pulsation characteristic amount in Embodiment 6.

DETAILED DESCRIPTION OF THE INVENTION

Embodiments of the present invention are explained with reference to drawings.

Embodiment 1

Figure 1:
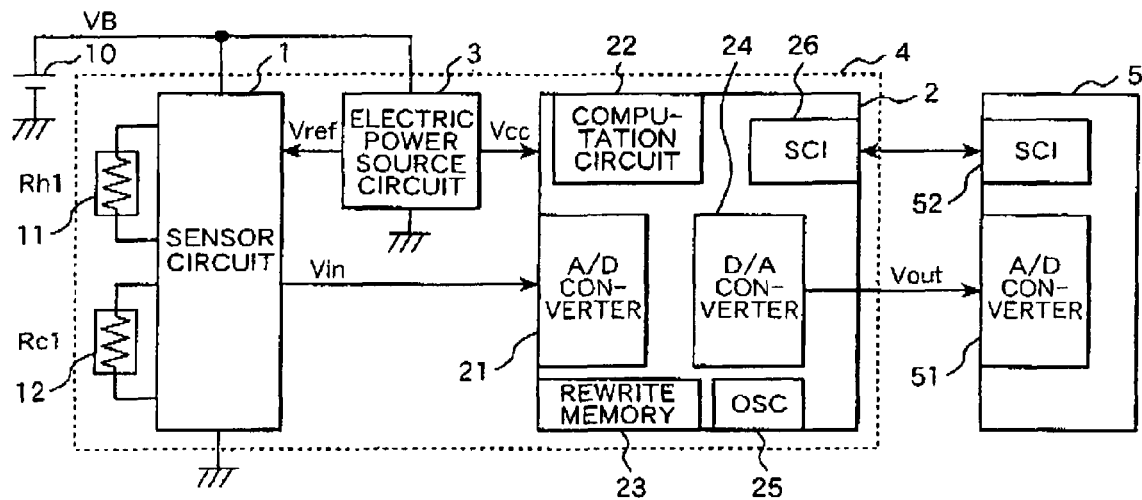
FIG. 1 is a system configuration diagram of a flow measuring device according to Embodiment 1 of the present invention.
Figure 2:
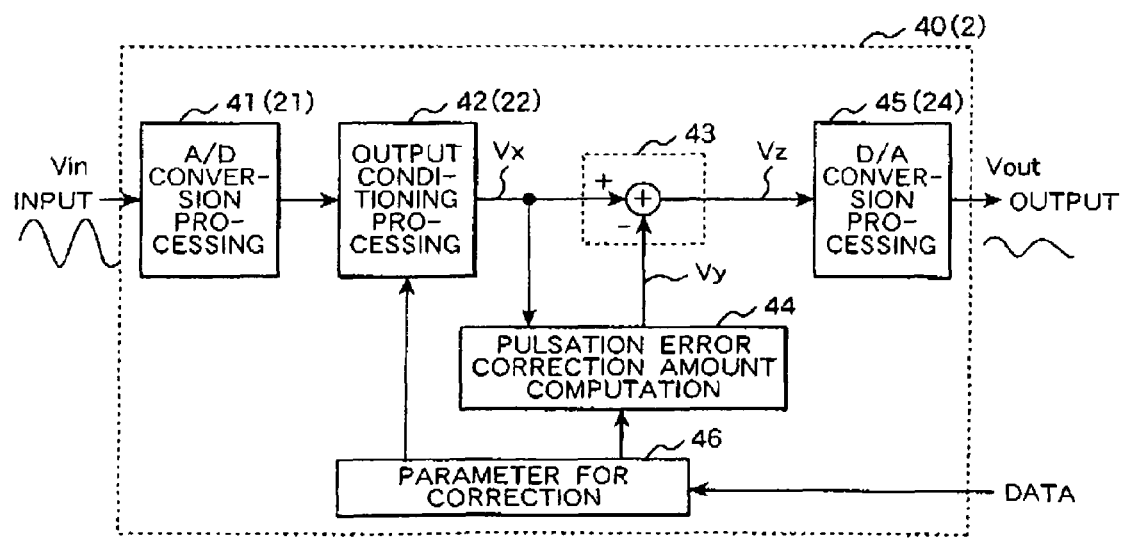
FIG. 2 is a block diagram showing digital processing for pulsation error correction used in Embodiment 1.

FIG. 1 is a configuration diagram showing a flow measuring device according to the present invention, and FIG. 2 is a block diagram showing digital processing for flow rate correction in the device. In the flow measuring device, as an example, a thermal air flowmeter to measure the flow rate of air flowing through the intake pipe of the internal combustion engine for an automobile is shown.

A flow measuring device 4 comprises a sensor circuit section 1 to output a flow rate signal and a flow rate signal output correction section (a digital processing section: a signal processor) 2, and is electrically connected to an engine control unit 5 of an internal combustion engine for a vehicle.

The sensor circuit section 1 has, as a flow rate sensor, a heat resistive element 11 and an air temperature compensation resistor 12. The sensor circuit section 1 is equipped with, for example: a known bridge circuit (not shown in the figures) wherein the heat resistive element 11 and the air temperature compensation resistor 12 are incorporated; an operational amplifier (not shown in the figures) to amplify a midpoint electric potential difference of the bridge circuit; and a transistor (not shown in the figures) to control the electric current for heating flowing through the heat resistive element 11 on the basis of the above operations. The heat resistive element 11 and the air temperature compensation resistor 12 are temperature-sensitive resistors having temperature dependency and placed in the air intake passage of an engine.

The sensor circuit section 1 is connected to an electric power source 10 and controls an electric current (heating current) for heating so that the temperature of the heat resistive element 11 keep a predetermined temperature difference from the temperature of air. That is, in the heat resistive element 11, heat thereof is taken away in accordance to an air flow rate and thereby the resistance changes, and the heating current flowing through the heat resistive element 11 is controlled so that the difference between both midpoint electric potentials in the bridge circuit becomes zero. By so doing, the heating current is controlled so that the temperature of the heat resistive element 11 becomes a predetermined temperature difference from the temperature of air. By directly converting the electric current into voltage, a sensed flow rate signal is produced and the flow rate is measured. Note that a flow rate may be measured from the temperature difference by disposing temperature sensing resistive elements on both sides of the heat resistive element in the air flow direction.

An electric power source circuit 3 forms reference voltage for driving the sensor circuit section 1 and the output correction section 2.

The output correction section 2 comprises a digital circuit such as a microcomputer or an exclusive logic circuit. It is equipped with an analog/digital converter (an A/D converter) 21, an arithmetic circuit 22, a rewrite memory 23, a digital/analog converter (a D/A converter) 24, an oscillator for driving 25, and a serial communication processor 26; and performs the following processing.

An output signal (a sensed flow rate signal: a nonlinear analog signal: an original signal) Vin from the sensor circuit section 1 is converted into a digital value with the analog/digital converter (the A/D converter) 21. The arithmetic circuit 22 corrects a pulsation error of the digitized sensed flow rate signal by using correction data stored in the rewrite memory 23. The sensed flow rate signal after corrected is converted into an analog signal again with the digital/analog converter (the D/A converter) 24. The analog signal is a nonlinear voltage value like a signal of the sensor circuit section 1 and is output to an engine control unit 5. The reason why the sensed flow rate signal after corrected is converted into an analog signal again is that an existing engine control unit 5 has an analog/digital converter (an A/D converter) 21.

The output correction section 2 can exchange data communication with an outside through the serial communication processing 26.

In the engine control unit 5, an output signal Vout from the flow measuring device 4 is converted into a digital signal with an analog/digital converter 51 to use for engine control. The engine control unit 5 can transmit a parameter for error correction to the flow measuring device 4 through via communication processing 52.

Next, the flow of arithmetic processing 40 carried out at the flow rate correction section 2 is explained with reference to FIG. 2.

The A/D converter 21 receives an output signal (a sensed flow rate signal) Vin from the sensor circuit 1, carries out analog/digital conversion processing 41, and converts the flow rate signal Vin from an analog value to a digital value. The output signal Vin is a nonlinear signal that includes a pulsative component and also an error caused by the nonlinearity.

The arithmetic circuit 22 performs a conditioning processing (output conditioning processing 42) for the digitized flow rate signal as necessary, and then performs processing for computing a correction amount Vy to a pulsation error (namely pulsation error correction amount computation processing 44) of the digital flow rate signal Vx. After that, the arithmetic circuit 22 performs addition or subtraction processing (addition-subtraction processing 43) to the digital flow rate signal Vx, which corresponds to the original signal (the nonlinear output signal: a sensor output signal) of a flow rate sensor, by using the correction amount Vy. A sign of plus (+) or minus (−) to the correction amount in the addition-subtraction processing 43 (namely a sign for adding or subtracting the correction amount Vy from the digital flow rate signal Vx as the sensor output), is decided in accordance with the characteristics of the sensor output signal Vx. Thus, by performing the correction to the sensor output signal Vx using the correction amount Vy, it is possible to improve a pulsation error arbitrarily either in the pulse direction or in the minus direction. In the present embodiment, for example, assuming that the pulsation error is in the plus direction, the case of subtraction processing is shown hereunder. Here, the plus or minus sign of a correction amount Vy can be converted by changing the plus or minus sign in addition-subtraction processing 67 for the computation of the correction amount that will be described later in accordance with sensor output characteristics.

In the pulsation error correction amount computation processing 44, the correction amount for the nonlinear error due to the pulsative component contained in the flow rate signal Vx is computed and the correction amount is sent to the addition-subtraction processing 43 as a correction signal Vy. In the addition-subtraction processing 43, the correction signal Vy is subtracted from the flow rate signal (the original signal) Vx, (namely Vx−Vy), and a flow rate signal after correction Vz is obtained. The corrected flow rate signal Vz is subjected to digital/analog conversion processing 45 with the D/A converter 24 and the analog signal is output to the engine control unit 5. In the pulsation error correction amount computation processing 44, it is possible to decide the correction amount for the pulsation error on the basis of the data of correction parameters 46 from the engine control unit or the like.

Figure 3:
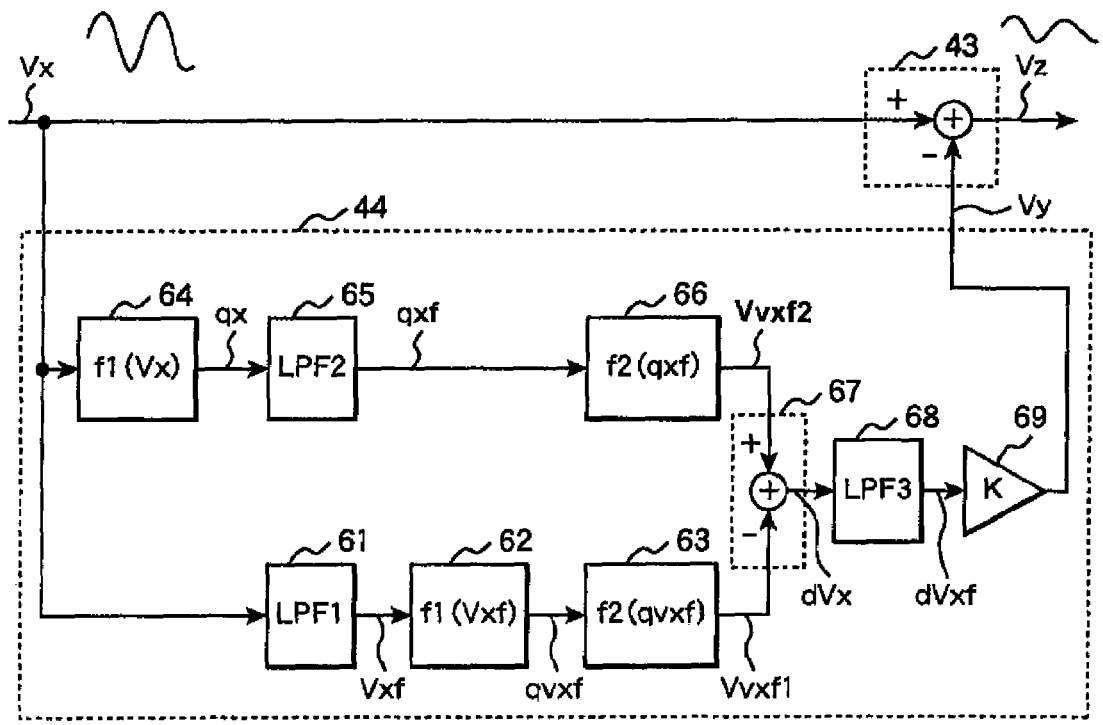
FIG. 3 is a block diagram showing signal processing for the computation of a pulsation error correction amount in Embodiment 1.

Here, a concrete example of the pulsation error correction amount computation processing 44 is explained with reference to FIG. 3.

In general, the relationship between a sensor output of a thermal flowmeter using a heat resistive element and an air flow rate is expressed with the following formula that is called King's formula.

$$Ih \cdot Ih \cdot Rh = (C1 + C2\sqrt{Q})(Th - Ta) \qquad (1)$$

Here, Ih represents a heating current flowing through a heat resistive element, Rh represents a resistance value of the heat resistive element, Th represents a surface temperature of the heat resistive element, Ta represents the temperature of air, Q an air flow rate, and C1 and C2 represents constants determined by the heat resistive element. An output of a sensor is generally determined by sensing the heating current Ih as a voltage through a resistor for sensing. The engine control unit 5 used for the control of an internal combustion engine converts an output voltage (an output voltage subjected to pulsation error correction processing in the present example) of a sensor into a flow rate on the basis of the formula (1) and controls the ratio of air to fuel in the internal combustion engine. The relationship between the sensor output signal of a thermal flowmeter and an actual flow rate is a nonlinear relation expressed by the formula (1) (fourth root of a flow rate means the sensed voltage) and hence some sort of a linearizing means is required in order to use a signal as a flow rate.

An output signal Vin of the sensor circuit section 1 is an output produced by converting the heating current flowing through the heat resistive element 11 into the voltage to be the nonlinear output signal. The output signal Vin includes air pulsation caused by the opening and closing operation of the inlet valve of the engine. If the output signal is filtered as it is in the state of a nonlinear signal (an original signal: here an output Vx after digitized), the signal after filtered includes an error and, when the signal is finally converted into a flow rate, some sort of a flow rate error (an error in the plus or minus direction) is caused. Specifically, when a nonlinear signal Vx is filtered through a lowpass filter (LPF), a minus mean value error is caused. In contrast, when a nonlinear signal Vx is filtered through a highpass filter (HPF), a plus mean value error is caused. This phenomenon can be used for the correction of a certain amount of pulsation signal by adjusting a time constant of the filter.

Figure 4A:
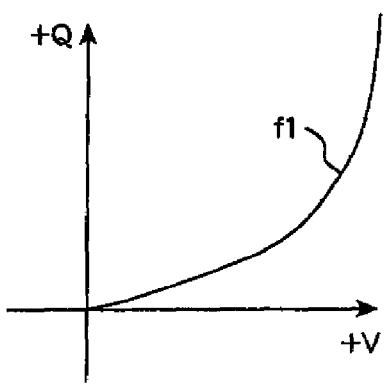
FIG. 4($a$) is a graph showing the characteristic of a V-Q conversion function and FIG. 4($b$) is a graph showing the characteristic of a Q-V conversion function, both the functions being used in Embodiment 1.
Figure 4B:
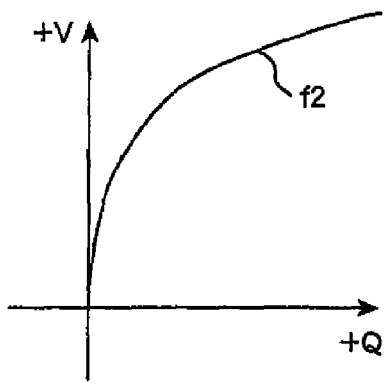

With regard to a correction amount of the pulsation error caused by nonlinearity, when a sensor originally has a low responsiveness, the amplitude of an original signal to be filtered is small and hence an effect of the correction amount is also small. In consideration of the above, in the present example, a minute amplitude of the filtered signal is obtained as a differential signal from a reference signal, and then the differential signal is amplified. Therefore, by optimizing the gain for the amplification, it is possible to optimally compute the correction amount of the pulsation error in the sensor output. Here, the details of signal processing in the pulsation error correction processing 44 are explained with reference to FIGS. 3 to 5.

A signal Vx as nonlinear output signal after the output conditioning processing 42 is sent to a first signal processing system and a second processing signal system respectively, and processed in both the systems. Thereby the differential signal dVx is produced from the differential outputs between both the systems (the first and second signal processing systems). The differential signal dVx is amplified, thus a pulsation error correction signal Vy is obtained, and a signal Vz after corrected in the addition and subtraction processing 43 is obtained.

Figure 5A:
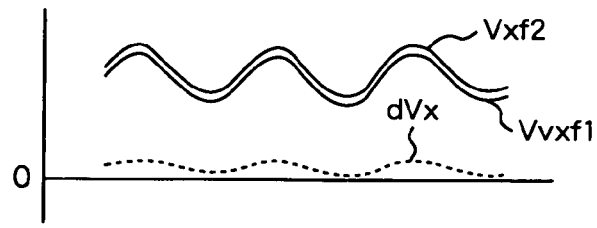
FIG. 5 comprises graphs showing the movements of waveforms in pulsation error correction processing in Embodiment 1.
Figure 21:
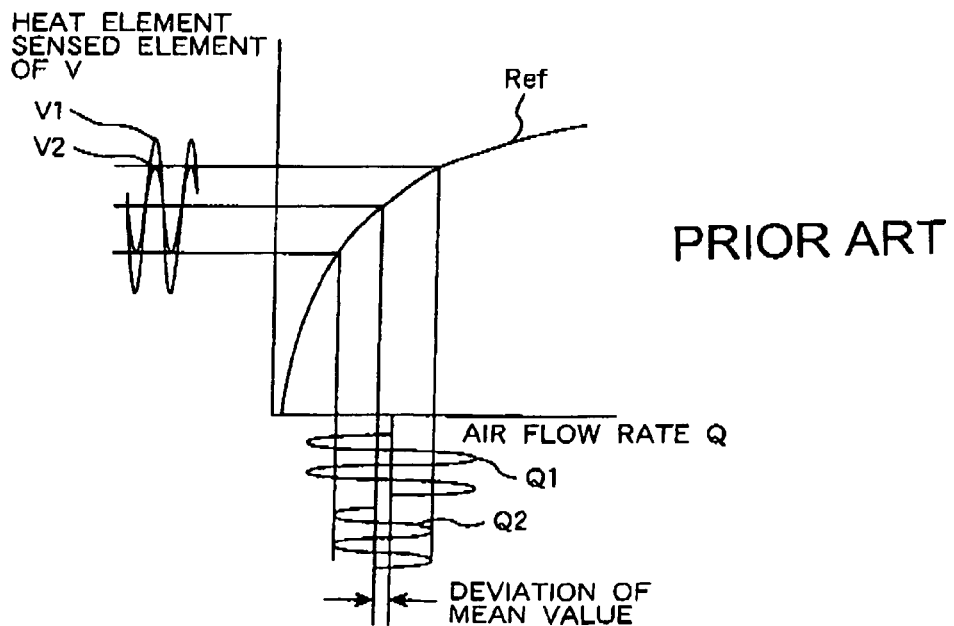
FIG. 21 is a graph showing the relationship among a sensor output, an air flow rate, and a mean flow rate.

The first signal processing system comprises a lowpass filter (LPF1) 61, a V-Q conversion processing section (a linearization processing section with an f1 function) 62; and a Q-V conversion processing section (a nonlinearization processing section with an f2 function) 63. In the first signal processing system, a minus error is intentionally produced in accordance with the magnitude of the pulsation of a nonlinear output signal Vx. That is, a nonlinear output signal Vx of the flow rate sensor is smoothened with the lowpass filter (LPF1) 61. The smoothened signal Vxf is linearized with a function f1 (a two-dimensional map (may be a table)) shown in FIG. 4(a) through the V-Q conversion processing section (f1) 62 and a flow rate signal (qvxf) as a first signal is obtained. According to FIG. 21, the smoothened signal Vxf corresponds to the signal V2 having a smaller pulsation (ripple) amplitude based on the signal from a heat resistive element. Incidentally, the signal V1 having a larger pulsation (ripple) amplitude corresponds to the original signal Vx before smoothening. According to FIG. 21, the linearized flow rate signal (qvxf) corresponds to a flow rate signal Q2. Q1 corresponds to a signal produced by the flow rate conversion of the original signal Vx (V1). Then in the mean value (average) of the flow rate signals (qvxf) linearized after smoothened, a mean value error (an error in the reducing direction) is caused as it is obvious also from the relationship between Q2 and Q1 as shown in FIG. 21. The flow rate signal (qvxf) is converted into a voltage with the function f2 (or a two-dimensional map (may be a table)) shown in FIG. 4(b) through the Q-V conversion processing section (f2) 63 and a nonlinearized first signal (Vvxf1) as shown in FIG. 5(a) is obtained.

On the other hand, the second signal system comprises a V-Q conversion processing section (a linearization processing section with the f1 function) 64, a lowpass filter (LPF2), and a Q-V conversion processing section (a nonlinearization processing section with the f2 function) 66. In the V-Q conversion processing section (f1) 64, firstly a nonlinear original signal Vx is linearized with the same function f1 as used in the aforementioned processing section 62 (or a two-dimensional map (may be a table)). By the linearization processing section 64, the original signal is converted into a flow rate signal (qx).

The flow rate signal (qx) can be regarded as a signal that scarcely includes a pulsation error by the sensitivity correction using the f1 function. The flow rate signal (qx) is smoothened with the lowpass filter (LPF2) 65 like the aforementioned LPF1 and a signal (qxf) is obtained. By the smoothening, the phase of the signal (qxf) is synchronized with the phase of a signal (qvxf) of the first signal system. The man value of the signals (qvxf) is larger than each signal (qvxf). The signal (qvxf) is converted into a nonlinear voltage with the function f2 (or a two-dimensional map (may be a table)) in the Q-V conversion processing section (f2) 66 and thereby a second signal (Vvxf2) is obtained as shown in FIG. 5(a).

As previously mentioned, whereas the first signal (Vvxf1) includes a minus error because the nonlinear signal is filtered and then linearized, the second signal (Vvxf2) includes no error because the nonlinear signal is linearized first and then filtered. In both the signals (Vvxf1 and Vvxf2), the sensitivities of them are corrected as previously described and their phases are brought into synchronization with each other, thereafter the computation (Vvxf2−Vvxf1) is carried out in the addition-subtraction processing section 67. By so doing, a differential signal (dVx) is obtained as shown in FIG. 5(a).

Since the differential signal (dVx) may sometimes vary in accordance with the waveform of an original signal, the signal is smoothened again with a lowpass filter (LPF3) 68 and a signal (dVxf) is obtained. The signal (dVxf) is amplified at an optimized gain (a gain K) in amplification processing 69 and a pulsation correction amount Vy is obtained.

The lowpass filter (LPF3) 68 is not necessarily be required but it can be said that the lowpass filter is desirably used when the variation of the correction amount is to be suppressed. Similarly, the V-Q conversion processing (f1) 62 and the Q-V conversion processing (f2) 63 in the first signal processing system may not completely be in the relation of inverse functions. However, it is desirable that they are in the relation of inverse functions for the reason described below.

It is desirable that the V-Q conversion processing (f1) and the Q-V conversion processing (f2) shown in FIG. 4 are in the relation of inverse functions. In order to reduce the error on the correction amount with approximate accuracy of functions together, it is attempted to match the sensitivities and the phases of the signals in the first and second signal processing systems respectively. By so doing, it is possible to remove the various causes concerning an error on the correction as much as possible even when a smaller differential signal dVx is obtained.

Figure 5B:
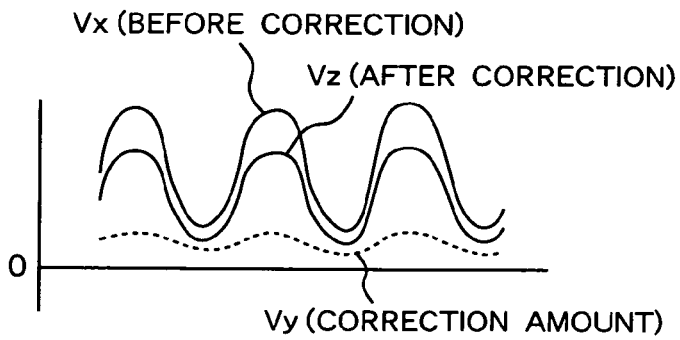

In the addition-subtraction processing section 43, as shown in FIG. 5(b), a signal Vz after correction is obtained by subtracting the correction amount Vy from the original signal Vx of the sensor output.

According to the present example, it is possible to attempt to reduce the pulsation error of the sensed flow rate signal by processing the sensed flow rate signal to obtain the pulsation error correction amount Vy and by adding or subtracting the pulsation error correction amount Vy to or from the original sensed flow rate signal Vx. Since the signal Vz after correction is obtained by adding or subtracting the correction amount Vy to or from the original sensed flow rate signal Vx not filtered, the mean value error is avoided, moreover noises in a pulsative component are removed. Thereby, a highly accurate mean value that reflects the magnitude of the amplitude and the frequency of pulsation of a sensed signal (the original flow rate signal) can be obtained.

For those reasons, in a flow measuring device according to the present example, it is possible to reduce a measurement error caused by pulsation without deteriorating basic characteristics of a sensor output.

In particular, it is made possible to effectively correct a pulsation error by amplifying a basically minute processing signal for the correction amount.

In the present invention, it is possible to attempt to improve a pulsation error not only in the plus direction but also in the minus direction by use of the feature in which the nonlinear error increases in accordance with the magnitude of pulsation (a minus error increases in the case of a lowpass filter (LPF)). That is, in more specific, by using the difference between the pulsation error due to nonlinear and the linearized reference signal whose phases and sensitivities are subjected to matching, by applying a gain (a gain K) optimized at the amplification processing 69 to the above-mentioned difference in accordance with the degree of the pulsation error in an actual system, and by deciding the plus or minus sign in the addition-subtraction processing 67 in accordance with characteristics of the sensor output (namely selection of addition or subtraction for two signals produced with the two signal processing systems), it is possible to attempt to improve the pulsation error not only in the plus direction but also in the minus direction. Concretely, the addition-subtraction processing section 67 produces (Vvxf1−Vvxf2) as the difference when a sensor output Vin (Vx) has the characteristic of a plus error, and, in contrast to this, when a sensor output Vin (Vx) has the characteristic of a minus error, the addition-subtraction processing section 67 in FIG. 3 produces inverse (Vvxf1−Vvxf2).

The above explanations on filtering have been made on the basis of a lowpass filter (LPF). However, a highpass filter (HPF) can also yield similar effects in principle although the degrees of the effects are not the same. Here, when a highpass filter (HPF) is used, noise also increases. Therefore, it is desirable to use a lowpass filter (LPF) in ordinary circumstances.

Figure 18:
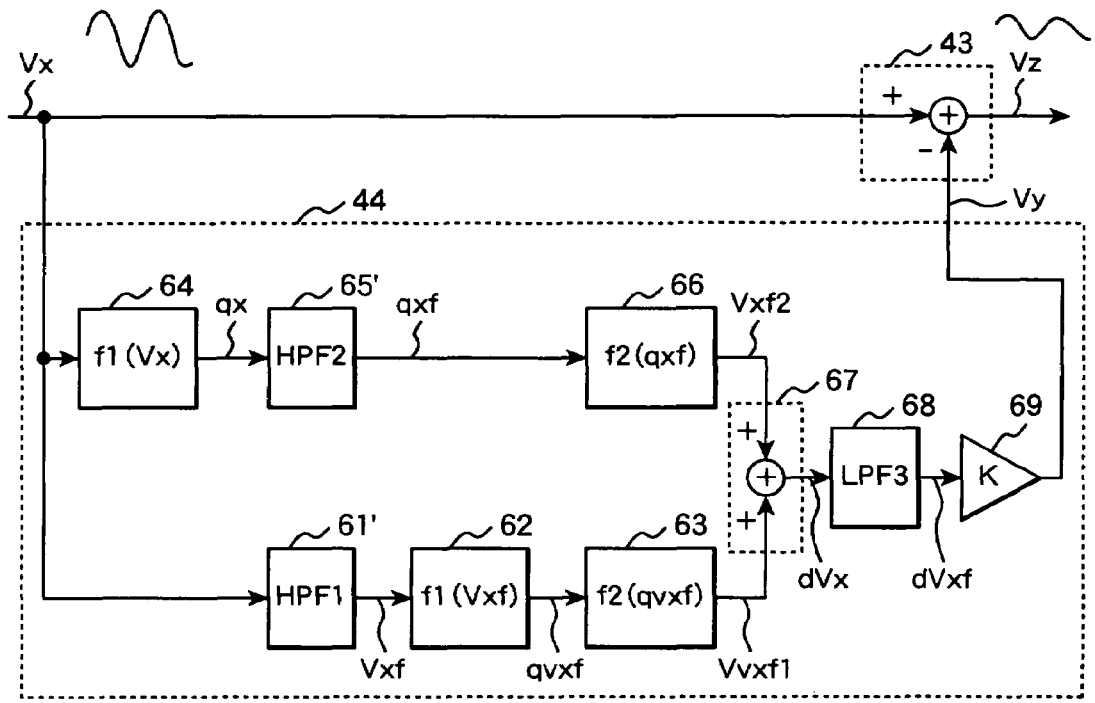
FIG. 18 is a block diagram showing pulsation error correction processing in a modification of Embodiment 1.
Figure 19A:
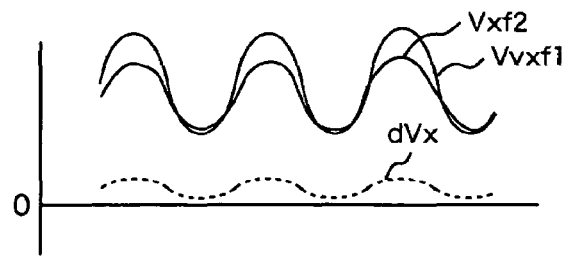
FIG. 19 comprises graphs showing the movements of waveforms for pulsation error correction processing.
Figure 19B:
Figure 20:
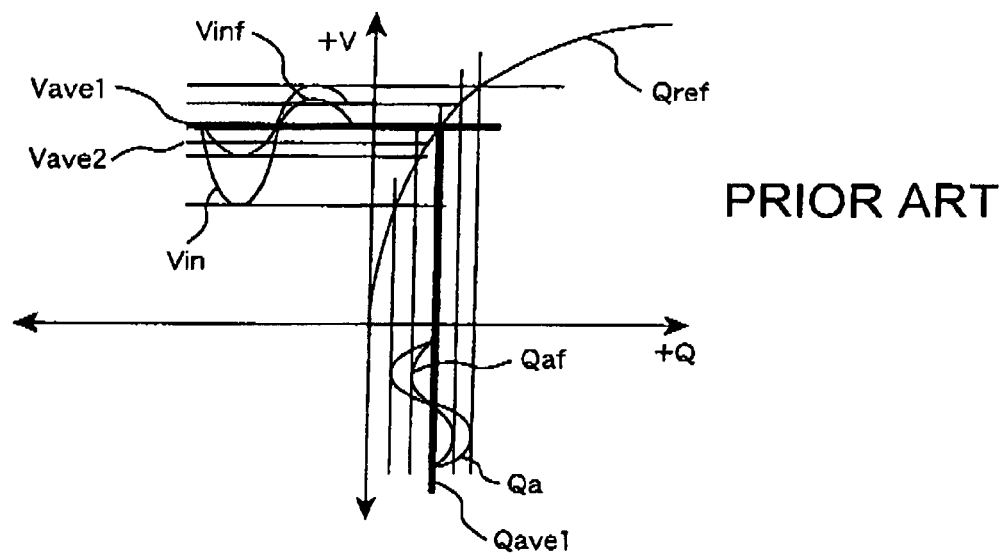
FIG. 20 is a graph showing output characteristics of a thermal air flowmeter.

FIG. 18 shows a pulsation error correction amount computation section 44 in which highpass filters are used. In FIG. 18, the difference from the pulsation error correction amount computation section 44 shown in FIG. 3 is that a highpass filter (HPF1) 61' and a highpass filter (HPF2) 65' are used instead of lowpass filters in the first and second signal processing systems, and the other configuration is the same as that shown in FIG. 3. The state of a processing signal for the pulsation error correction amount computation and a sensor output signal after the error correction in FIG. 18 are shown in FIG. 19(a) and FIG. 19(b).

Embodiment 2

Figure 6A:
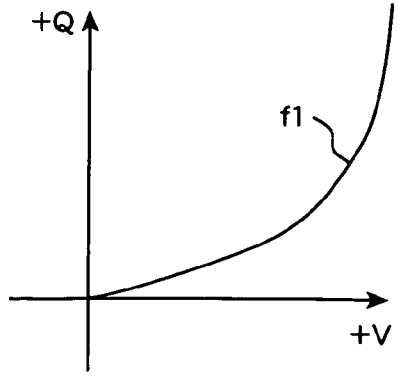
FIG. 6($a$) is a graph showing the characteristic of a V-Q conversion function and FIG. 6($b$) is a graph showing the characteristic of a Q-V conversion function, both the functions being used in Embodiment 2 of the present invention.
Figure 6B:
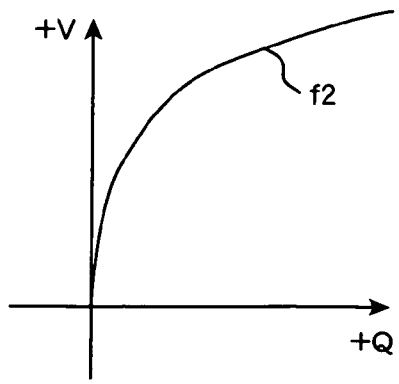

Example 2 is explained. The V-Q conversion processing (f1) and the Q-V conversion processing (f2) shown in aforementioned FIG. 4 can be actually applied even though asymmetrical functions are used. In FIG. 6A, an example of asymmetrical functions, this embodiment adopts a function of the third power of a voltage (namely V*V*V) is used in processing corresponding to the V-Q conversion processing (f1) and a root function ($\sqrt{}$) or the like is used in place of the Q-V conversion processing (f2). Even such a case can be realized as long as the configuration of the present invention is adopted. By simplifying the functions in this way, the effect of simplifying the digital processing when the functions are produced can be obtained.

Embodiment 3

Figure 7:
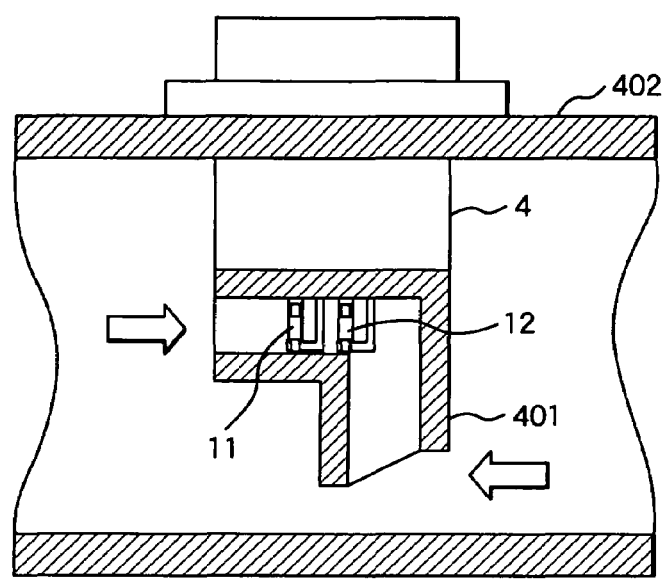
FIG. 7 is a sectional view showing a bypass and a flow rate sensor disposed in an intake passage and used in Embodiment 3 of the present invention.
Figure 8:
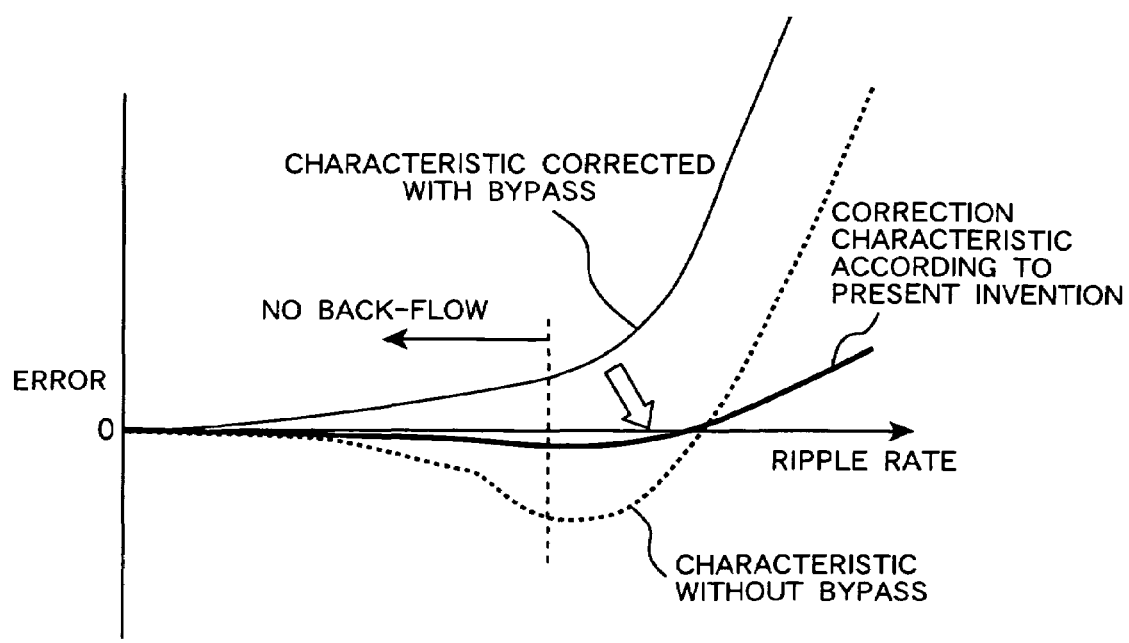
FIG. 8 is a graph showing the effect of pulsation error correction in Embodiment 3.

Embodiment 3 is shown in FIGS. 7 and 8. This embodiment represents the case where the sensor (the heat resistive element 11 and the temperature compensation resistor 12) used for the air flow measuring device in aforementioned Embodiments 1 and 2 is disposed in a bypass air passage 401 of a bent shape. The circuit configuration of the flow measuring device is the same as shown in FIGS. 1 to 3. FIG. 7 is a sectional view showing a flowmeter 4 including a bypass 401 disposed in an intake passage 402. When a sensor is disposed in such a bypass 401, the influence of flow caused by back-flow from an engine can be reduced and, by the inertia effect of the flow caused by the bypass, a plus error is generally included in an output signal Vin (Vx) from the sensor in the sate of pulsation.

On the other hand, when a sensor is disposed in an intake passage without a bypass 401, as a ripple rate ((maximum value−minimum value)/mean value) that is an index showing the magnitude of pulsation increases, the output characteristic of the sensed signal shows a minus error. However, when back-flow occurs and increases, the output characteristic of a sensed signal becomes a plus error.

The bypass 401 is made of a molded product (a resin product). By use of the bypass 401, the output characteristic of a sensor generally shows a plus error. However, an excessive plus error may occur due to a low ripple rate under combination of some sort of test conditions and an influence of the air flow outside the bypass. Therefore, a more-than-expected error may occur particularly depending on the shape of an air cleaner and the like, and the problems here are that the change of the bypass is required at the stage of system conformance and thus the development cost increases by the remodeling of design, versatility is lost due to the difference of the structure and that causes the production cost to increase, and the development period is prolonged.

Even when a sensor output characteristic of a plus error arises as stated above, by trying to optimize a correction parameter with a flow measuring device according to the present invention and forming a minus pulsation error correction amount Vy on the basis of the optimization, it is possible to reduce the error up to a certain amount of ripple rate. As stated above, the present invention makes it possible to improve the sensor output (pulsation error correction) in accordance with external conditions of an object such as an air cleaner even in the case of a conventional bypass shape. As a result, it is possible to provide a flow measuring device having high versatility and being able to contribute to cost reduction.

Embodiment 4

Figure 9:
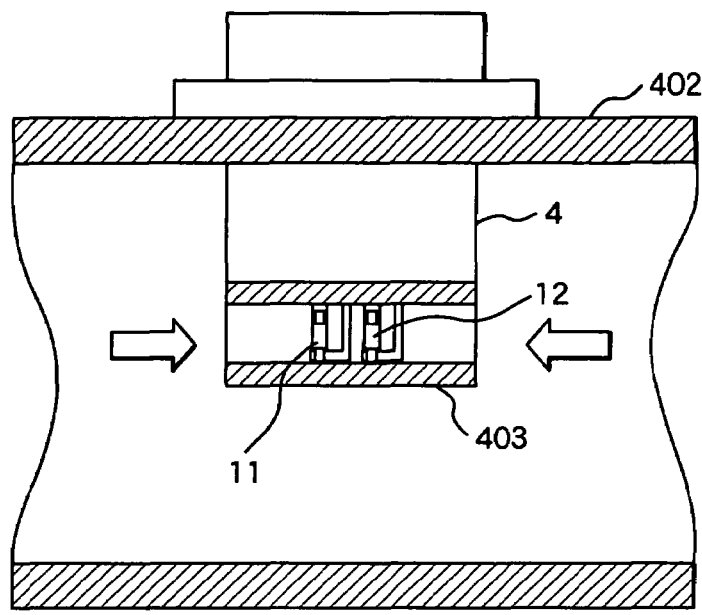
FIG. 9 is a sectional view showing a bypass and a flow rate sensor disposed in an intake passage and used in Embodiment 4 of the present invention.
Figure 10:
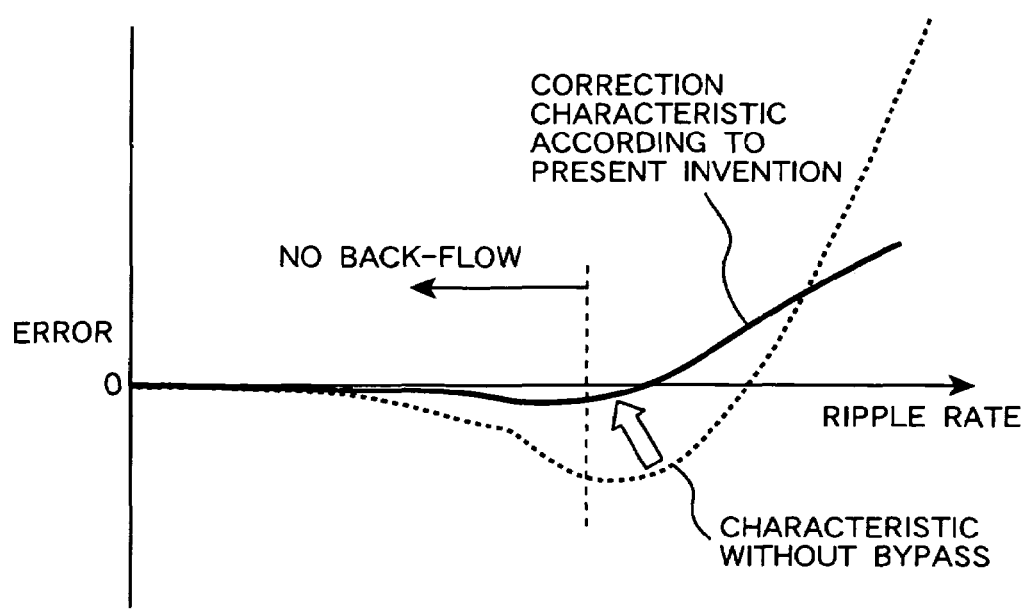
FIG. 10 is a graph showing the effect in Embodiment 4. (Embodiment 4).

Embodiment 4 is shown in FIGS. 9 and 10. The present embodiment represents the case where the sensor (the heat resistive element 11 and the temperature compensation resistor 12) used for the air flow measuring device in aforementioned Embodiments 1 and 2 is disposed in a bypass air passage 402 of a straight shape with no bend. When a bypass has no bend, contrary to the previous embodiment, the inertia effect by a bypass cannot be expected. Therefore, the sensor output generates a minus error until back-flow increases constantly. In this case, as stated above, the plus or minus sign at the addition or subtraction processing section 67 shown in FIG. 3 is reversed (Vvxf1−Vvxf2) and a plus error correction amount is generated when pulsation occurs. By so doing, it is possible to improve the minus error characteristic of an output signal at the time of pulsation. Although a characteristic of a small error is obtained by changing the plus or minus sign in the addition or subtraction processing 67 here, it is also possible to use a highpass filter (HPF) for filtering while the plus or minus sign is not changed.

Incidentally, in the case of a bypass 403 of a straight structure with no bend, the trend of a pulsation error due to back-flow is easy to be recognized. Hence, the pulsation error can also be reduced by applying the flow measuring device according to the present invention to such a bypass.

In addition, when adopting the flow measuring device of the present invention to such a bypass pulsation, it is possible to increase system configuration-wide flexibility in a system for feeding intake air with pulsation characteristics.

Embodiment 5

Figure 11:
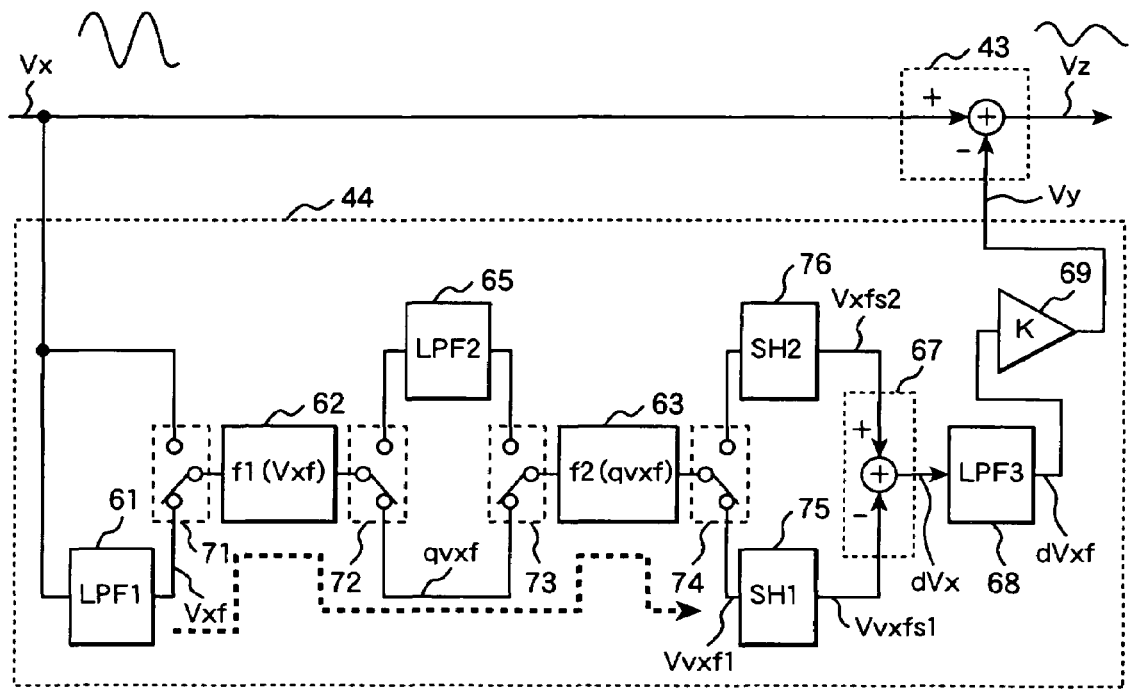
FIG. 11 is a block diagram showing signal processing for the computation of a pulsation error correction amount in Embodiment 5 of the present invention.
Figure 12:
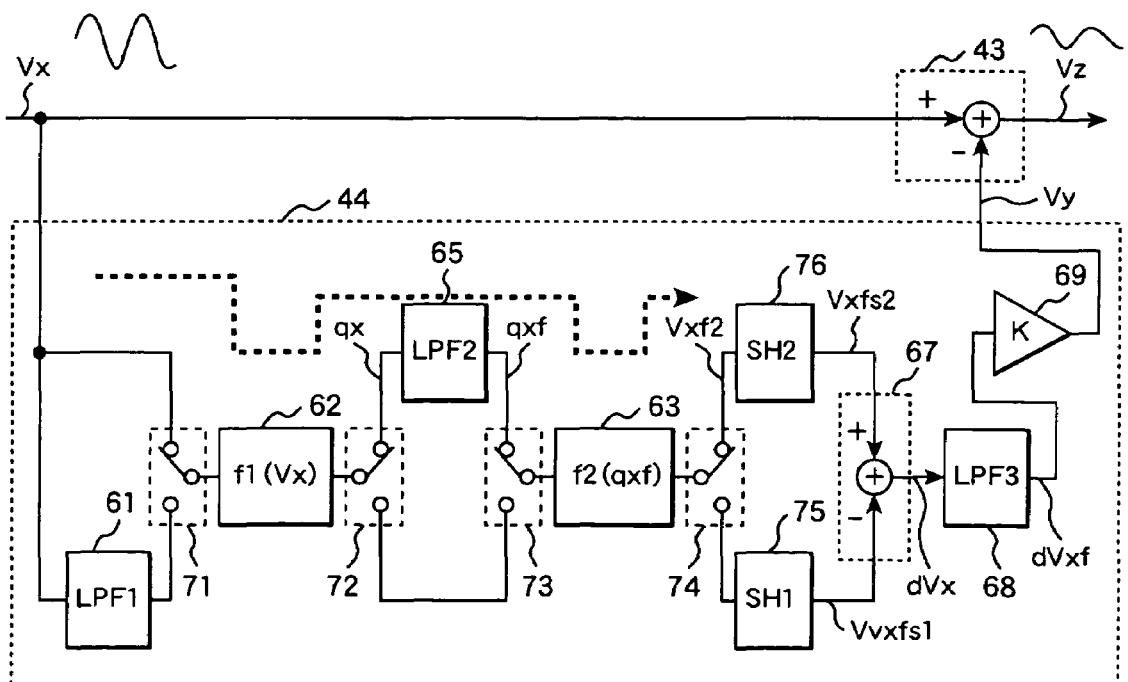
FIG. 12 is another block diagram showing signal processing for the computation of a pulsation error correction amount in Embodiment 5.

Embodiment 5 is shown in FIGS. 11 and 12. The present embodiment represents a configuration where the first and second signal processing systems described in FIG. 3 are made switchable by time-sharing. Further, the first and second signal processing systems allow the shared use of the V-Q conversion processing section (the linearization processing section based on the f1 function) 62 and the Q-V conversion processing section (the nonlinearization processing section based on the f2 function) 63. Thereby the V-Q conversion processing section (the linearization processing section based on the f1 function) 64 and the Q-V conversion processing section (the nonlinearization processing section based on the f2 function) 65 used in FIG. 3 are omitted in this embodiment. In the present embodiment, it is intended to reduce the number of processing sections by sharing some of processing sections (processing blocks).

That is, in each processing in this embodiment, the V-Q conversion processing (f1) 62 and the Q-V conversion processing (f2) 63, which have relatively heavy computation loads respectively, are switched in the manner of time-sharing with switches 71, 72, 73, and 74 and thereby can be used in both of the first and second signal processing systems. Additionally, in this embodiment, sample hold processing sections 75 and 76 are switchably disposed between the Q-V conversion processing (f2) 63 and the addition-subtraction processing section 67 via the switch 74. The sample hold processing section 75 belongs to the first signal processing system and the sample hold processing section 76 belongs to the second signal processing system.

FIG. 11 shows operations in the first signal processing system and switches 71, 72, 73, and 74 are switched to the first signal processing system with the first system clock. Thereby, a processing system similar to the first signal processing system shown in FIG. 3 is configured. A first signal (Vvxf1) is sampled and held with a sample hold processing section 75. The sampled and held first signal is shown as (Vvxfs1). With the next system clock, the switches 71, 72, 73, and 74 are switched to the second signal processing system. Thereby, a processing system similar to the second signal processing system shown in FIG. 3 is configured. A second signal (Vxf2) is sampled and held with a sample hold processing section 76. The sampled and held signal is shown as (Vvxfs2). By adding or subtracting the difference between the two signals (Vvxfs1, Vvxfs2) with the addition-subtraction processing section 67 after the sample hold processing, the functions and effects similar to the aforementioned embodiments can be obtained. In this embodiment, the reflection of the results delays by one clock but the influence of the delay is minimal if the operations are carried out with a sufficiently fast system clock. As stated above, when processing is operated by time-sharing, the effects that the present invention can be realized with fewer program regions and the cost of parts can be reduced are obtained.

Embodiment 6

Figure 13:
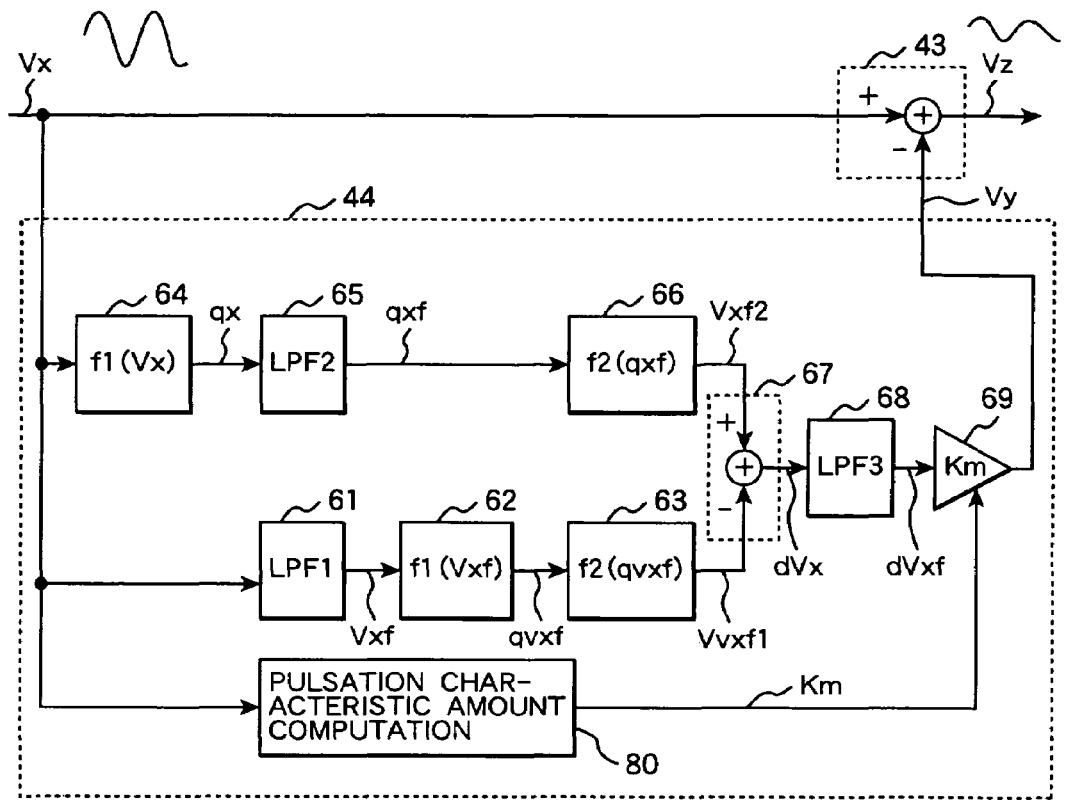
FIG. 13 is a block diagram showing signal processing for the computation of a pulsation error correction amount in Embodiment 6 of the present invention.
Figure 14A:
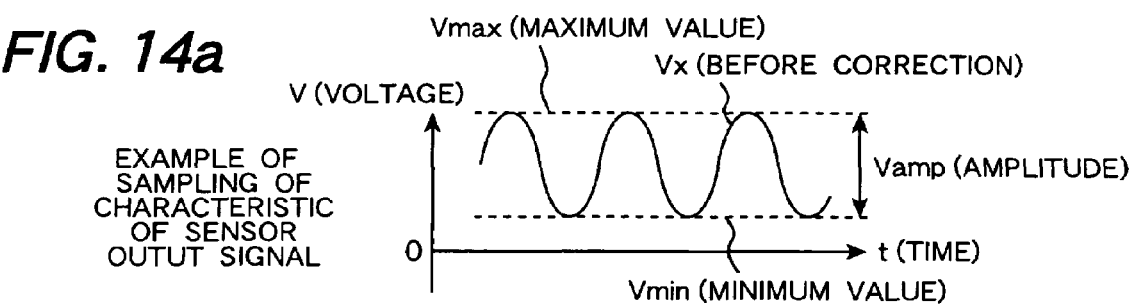
FIG. 14 comprises explanatory graphs showing operations in the computation processing of a pulsation characteristic amount in Embodiment 6.
Figure 14B:
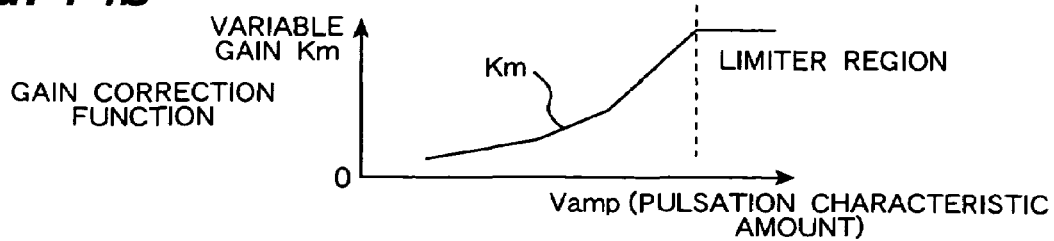

Embodiment 6 is shown in FIGS. 13 to 15. The pulsation error correction processing section 44 shown in FIG. 13 is basically the same as that shown in FIG. 3 and the difference is only that pulsation characteristic amount computation processing 80 is added. The computation result of a pulsation characteristic amount is obtained, a gain Km is variably set with an amplification processing section 69, the aforementioned differential signal dVxf is amplified with a gain on which the variable gain Km is reflected, and thus the pulsation correction amount Vy is obtained.

Here, the operations of the pulsation characteristic amount computation processing section 44 are explained with reference to FIG. 14.

An output signal Vx from a sensor takes a cyclic waveform close to a sine waveform when pulsation of the air flow occurs. Therefore, the maximum value (Vmax) and the minimum value (Vmin) thereof are obtained by buffering the output signal for a certain period of time, for example, by a digital method and searching the data.

The difference between the maximum value (Vmax) and the minimum value (Vmin) obtained as the result is obtained as an amplitude (Vamp). It is also possible to increase the pulsation error correction amount Vy in accordance with the magnitude of pulsation by changing the gain Km in accordance with the amplitude (Vamp). By so doing, a large plus error generated after back-flow can also be reduced effectively by increasing the correction amount in accordance with the amount of the back-flow. In the case of FIG. 14, the amplitude (Vamp) is used as a pulsation characteristic amount and it is intended to obtain a larger effect with a function where the variable gain Km gradually increases. However, since a differential signal dVxf is also a signal on which the magnitude of pulsation is reflected, if the variable gain is too much increased, the accuracy pulsation error correction may be obtained because of excessive correction. In order to avoid the too much increase of a variable gain Km and excessive correction, a limiter is provided in this embodiment to keep the variable gain Km constant when an amplitude (Vamp) is greater than or equal to a predetermined value is disposed.

With regard to the computation of a pulsation characteristic amount, a signal (Rt) produced by dividing the amplitude (Vamp) by an mean value (Vave=(Vmin+Vamp)/2), namely (Rt=Vamp/Vave) standardizing the magnitude of the pulsation by the mean value (Vave) may also be used. This method is desirable because the dependency of an error characteristic on a flow rate can be further improved but instead the computation load also increases. Therefore, in an application where the flow rate range is not so large or the like, sufficient efficiency can be obtained even when the method is not used.

An example of the case where the present embodiment is used in combination with a bypass and particularly the computation of a pulsation characteristic amount is optimized with the computation using an amplitude (Vamp) and the minimum value (Vmin) of the sensor output is explained with reference to FIG. 15.

FIG. 15(a) shows a classification of conditions when a pulsation error occurs in an output signal from a sensor. In the graphs of FIG. 15, a ripple rate is shown along the horizontal axis and a pulsation error is shown along the vertical axis.

As shown in FIG. 15(a), when considering a pulsation error characteristic (an error characteristic corrected with a bypass) to a ripple rate of the pulsation, the characteristic is classified into three regions. Namely, the region 1 where no back-flow exists and a small plus error of the pulsation occurs by a small ripple rate (small pulsation), the region 2 where the plus error of the pulsation is moderately suppressed by a medium ripple rate by a back-flow confinement effect by the bypass, and the region 3 where the plus error of the pulsation increases by a large ripple rate due to back-flow. The error characteristic having such regions is a typical characteristic of the case where a single-way probe having no back-flow sensing function is used in a bypass.

Here, when considering the characteristic of the sensor output when the pulsation error occurs, as shown in FIG. 15(b), the amplitude (Vamp) of the sensor output increases with most gradient in the region 1 where back-flow does not yet occur. In the region 2 where back-flow occurs, the gradient of the amplitude (Vamp) lowers in the state where the back-flow confinement effect exists. In the region 3 where the back-flow confinement effect of a bypass disappears, a nearly constant saturated gradient characteristic of the sensor output amplitude is obtained.

This characteristic can be explained by the following reasons.

The maximum value (Vmax) of the amplitude (Vamp) increases at a certain rate as the ripple rate increases in accordance with the pulsation component of a sensor output signal. In contrast, the minimum value (Vmin) decreases at a certain rate as the ripple rate increases in the region 1 where no back-flow occurs. With regard to the minimum value (Vmin), when a single-way probe that cannot sense the back-flow is used, the signal is saturated in the region 2 where back-flow occurs. Specifically this means that the signal at back-flow is not input because of the back-flow confinement of a bypass in spite of the fact that back-flow occurs, and hence the minimum value is saturated. In contrast, in the region 3 where the back-flow confinement effect of a bypass does not exist, the characteristic in that the minimum value of pulsation increases from the saturated state due to the input of back-flow is shown. As a result, even when a signal (Rt) produced by dividing the amplitude (Vamp) by an mean value (Vave=(Vmin+Vamp)/2) and thus standardizing the magnitude of the pulsation with the mean value (Vave) is used (Rt=Vamp/Vave) as stated above, the correction effect decreases in the region 3 where the back-flow confinement effect of a bypass does not exist.

In the present embodiment, the minimum value (Vmin) is increased by n times (for example n=2) and multiplied by the amplitude (Vamp), and thus the variable gain Km (Km=Vamp*Vmin*n)) shown in FIG. 5(c) is obtained. As a result, the largest variable gain Km is obtained in the region 3 where the pulsation error is large (incidentally, in the present embodiment too, in the same way as the previous embodiments, it is desirable to set a limiter to the variable gain Km to prevent excessive correction). When the correction amount is applied to the region 1 by using the variable gain Km in the present embodiment, since the original difference dVx is small without back-flow even if the variable gain Km is large, the correction amount in the region 1 is small. Incidentally, the trend of the difference dVx without scale is shown with the broken line of the FIG. 5(c). As a result, as shown in FIG. 15(d), it is possible to reduce a back-flow error from the region of a small ripple rate to the region of a large ripple rate. According to the present invention, a back-flow error can be reduced in a wide range of a ripple rate and thereby an exhaust gas of the internal combustion engine of the vehicle can be reduced under wide ranges of conditions by applying the present invention to the engine control.

Figure 16:
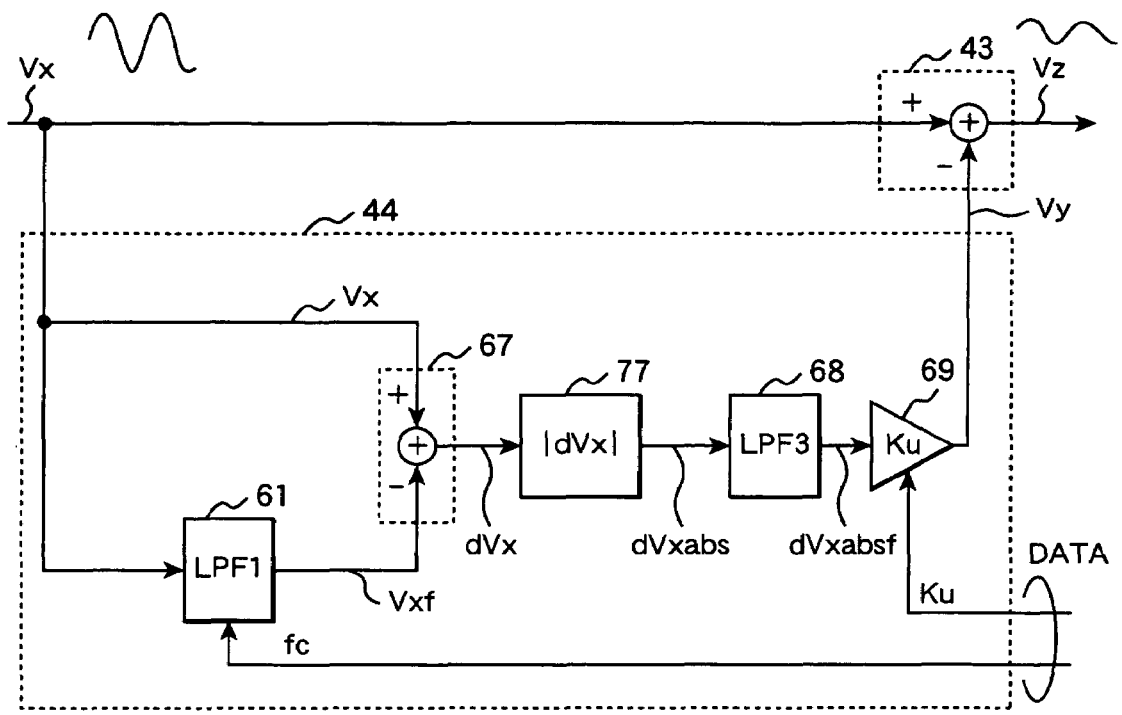
FIG. 16 is a block diagram showing signal processing for the computation of a pulsation error correction amount in Embodiment 7 of the present invention.
Figure 17A:
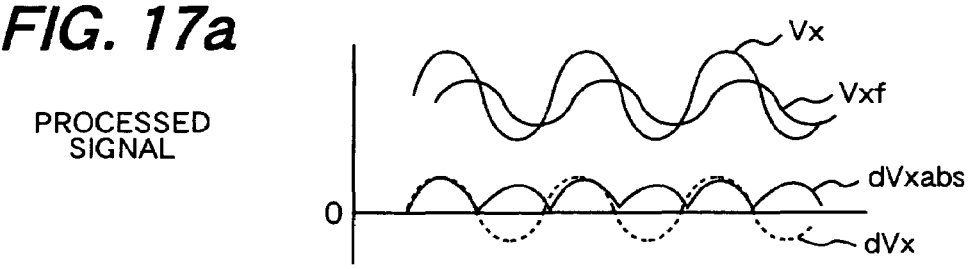
FIG. 17 comprises explanatory graphs showing the movements of waveforms for pulsation error correction in Embodiment 7.
Figure 17B:
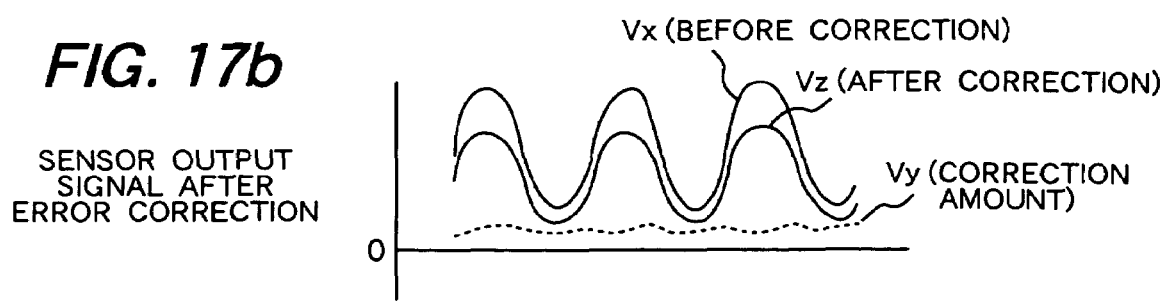

Embodiment 7 according to the present invention is shown in FIGS. 16 and 17. The configuration of the pulsation error correction processing section 44 in the present embodiment is more simplified than that in the previous embodiments.

The details of the configuration and the operations of the pulsation error correction processing section 44 are explained with reference to FIG. 16. Here, in a flow measuring device of the present embodiment, since the configuration other than the pulsation error correction processing section 44 is common to those in the previous embodiments, the explanations are omitted about the configuration other than the pulsation error correction processing section 44.

In the pulsation error correction processing section 44 of the previous embodiments, the correction amount for the sensor output signal at the time of pulsation has been obtained through the combination of the V-Q conversion processing (f1), the Q-V conversion processing (f2), and the filtering as shown in FIG. 4. In contrast, in the pulsation error correction processing section 44 of the present embodiment, the V-Q conversion processing (f1) and the Q-V conversion processing (f2) are not used and the signal processing is performed through the following system. A sensor output signal (a non-linear original signal from the sensor element: original output signal) Vx after digital conversion is filtered through filtering 61 (a lowpass filter: LPF1 a first filter) and the differential dVx between the filtered signal (Vxf) and the original signal Vx is obtained with the addition-subtraction processing section 67. Waveforms when the differential signal dVx is obtained are shown in FIG. 17. A phase difference exists between the original output signal Vx and the filtered signal (Vxf) unlike the previous first and second signals and hence the differential signal dVx appears in both of plus and minus values. Since the mean value of the waveform (the difference signal dVx with the phase difference is zero, it is impossible to obtain the pulsation correction amount Vy according to as-is even when the signal is amplified. Then the differential signal dVx is converted into an absolute value with an absolute value processing section 77 of the signal processor. That is, the differential signal dVx is converted into a signal (dVxabs) of only a plus value. The signal (dVxabs) is smoothened through filtering 68 (a lowpass filter: LPF3: a second filter) and thereafter amplified with an amplification processing section 69. The amplification is performed with a gain Ku that can be changed from external information and resultantly the correction amount Vy is obtained. The correction for the pulsation error is carried out by adding or subtracting the correction amount Vy to or from the output signal (the original signal) Vx of the sensor element by addition-subtraction processing 43. By such a configuration too, a pulsation error can be reduced in the same way as the previous embodiments. The differential signal dVx is more likely to be influenced by a cut-off frequency (fc) of the filtering 68 (a lowpass filter: LPF3) than that in the previous embodiments. For that reason, by making a cut-off frequency variable in response to an engine rotational frequency, correction with a small error can be realized in a wider range. Even such a simple system as shown in the present embodiment can be utilized and is effective except the region where a ripple rate is particularly large (the correction amount decreases by the trend of a waveform in a region where pulsation is large). It goes without saying that, if the aforementioned pulsation characteristic amount or the like is applied, the error further reduces. In particular, it can be said that the present embodiment is a system effective in using in an engine control unit 5.

Further, in the present embodiment, conditioning data is received from an engine control unit 5 and thereby the cut-off frequency (fc) of a filter (LPF1) and the gain (Ku) are changed. Such a configuration can be applied to signal processing in a flowmeter 4 as explained above and, if processing is simplified, it becomes easy to apply the configuration to software in the engine control unit 5. Although the explanations are made in the present embodiment on the premise that the processing is carried out in a flowmeter 4, if the processing is carried out in the engine control unit 5, the conditioning data is not required any more to be transferred to the flowmeter 4 and there are advantages such as the reduction of wiring.

The present invention relates to a system for processing an output signal of an air or gas flowmeter and is applicable also to applications combined with an air cleaner as a flowmeter for an automobile. As a result, when the present invention is applied to the control of an engine, the control with a higher degree of accuracy can be realized and the effects of the reduction of exhausted gas and the improvement of fuel efficiency can be realized.

What is claimed is:

1. A flow measuring device having a sensor element for outputting a nonlinear signal according to a flow rate, comprising:
   a first signal processing system for obtaining a first signal by filtering the nonlinear signal output from said sensor element, thereafter correcting a sensitivity of the filtered signal;
   a second signal processing system for obtaining a second signal by performing linearization and correction to the nonlinear signal from said sensor element, thereafter filtering the linearized signal with corrected sensitivity, and then nonlinearizing the filtered, linearized signal with the corrected sensitivity;
   an amplifier for amplifying a differential signal between said first and second signals; and
   a correcting section for correcting the nonlinear signal by using the amplified differential signal.

2. The flow measuring device according to claim 1, wherein:
   said first signal processing system is configured by connecting a lowpass filter, a voltage-flow rate converter for performing linearization, and a flow rate-voltage converter for performing nonlinearization to each other, in order of the listed; and
   said second signal processing system is configured by connecting a voltage-flow rate converter for performing linearization, a lowpass filter, and a flow rate-voltage converter for performing nonlinearization to each other, in order of the listed.

3. The flow measuring device according to claim 2, wherein:
   said first and second signal processing systems are operated with time-sharing; and
   said voltage-flow rate converters in said first and second signal processing systems are shared with these signal processing signals by a common converter, via a changeover switch for selectively connecting said section for correcting said sensitivities to either one of said first and second signal processing systems.

4. The flow measuring device according to claim 1, wherein:
   said first signal processing system is configured by connecting a highpass filter, a voltage-flow rate converter for performing linearization, and a flow rate-voltage converter for performing nonlinearization to each other, in order of the listed; and
   said second signal processing system is configured by connecting a voltage-flow rate converter for performing linearization, a highpass filter, and a flow rate-voltage converter for performing nonlinearization to each other, in order of the listed.

5. The flow measuring device according to claim 1, wherein said each filtering is performed with a variable filter capable of changing a frequency band in accordance with a magnitude of an input signal.

6. The flow measuring device according to claim 1, wherein:
   said first and second signal processing systems are operated with time-sharing; and
   said first and second signal processing systems allow the shared use of a section for correcting said sensitivities of said filtered signals respectively, via a changeover switch for selectively connecting said section for correcting said sensitivities to either one of said first and second signal processing systems.

7. The flow measuring device according to claim 1, wherein:
   said amplifier is configured to variably set a gain for amplifying said differential signal so that the gain depends on a magnitude of an AC signal component or a magnitude of a variation per time caused by pulsation of a flow rate signal; and
   said gain is variably set with a function or a map.

8. The flow measuring device according to claim 1, wherein:

wherein each filtering at said first and second signal processing system is performed with a variable filter capable of changing its frequency band in accordance with a magnitude of an input signal; and said amplifier is configured to variably set a gain for amplifying said differential signal in accordance with said frequency band.

9. The flow measuring device according to claim 1, wherein said sensor element is placed in a bypass disposed along a fluid passage for feeding a fluid to be measured.

10. The flow measuring device according to claim 1, wherein said amplifier is configured to variably set a gain for amplifying said differential signal so that said gain can be changed in accordance with information from an external engine controller or the other external controller.

* * * * *